Patented June 25, 1940

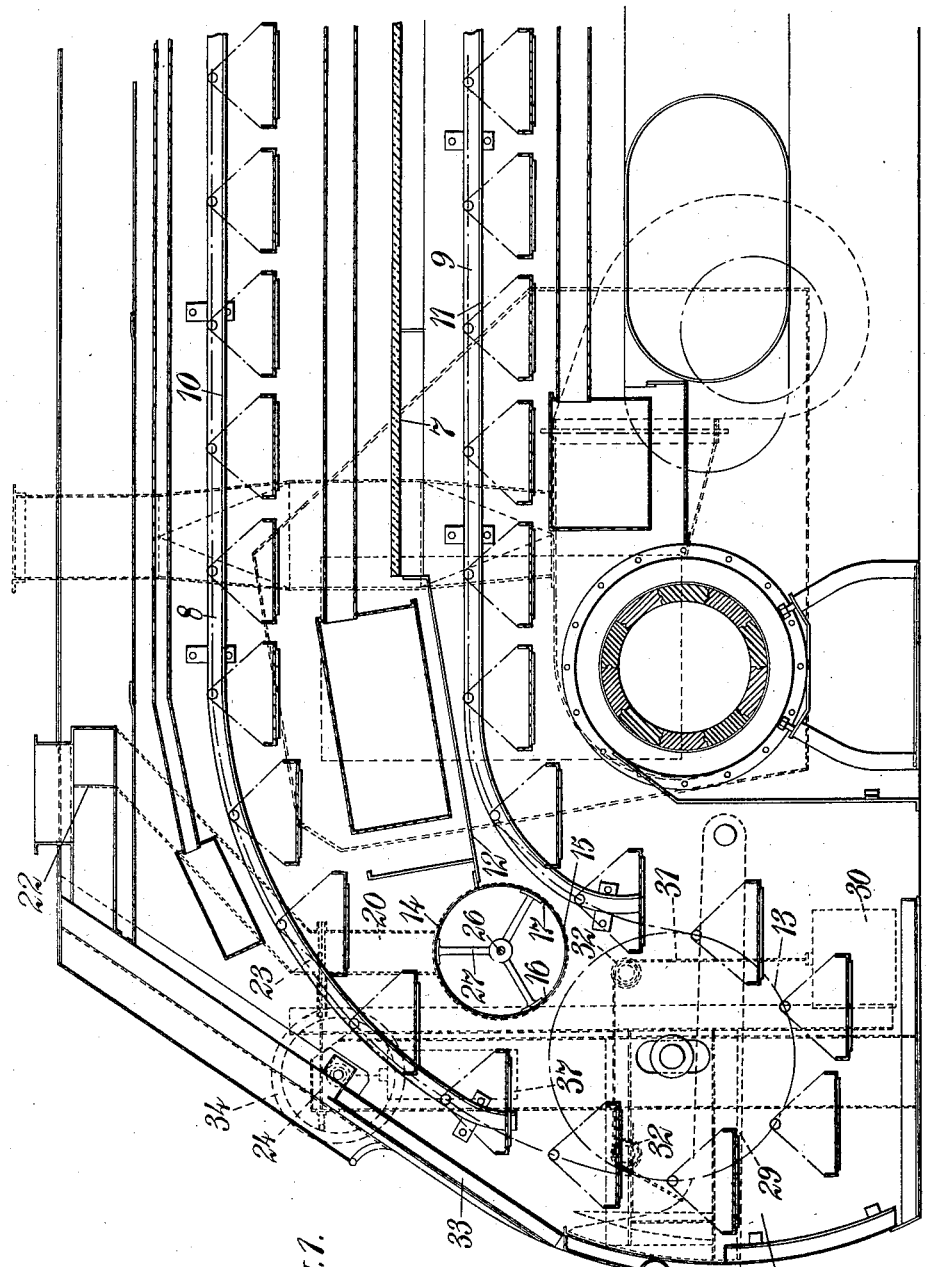

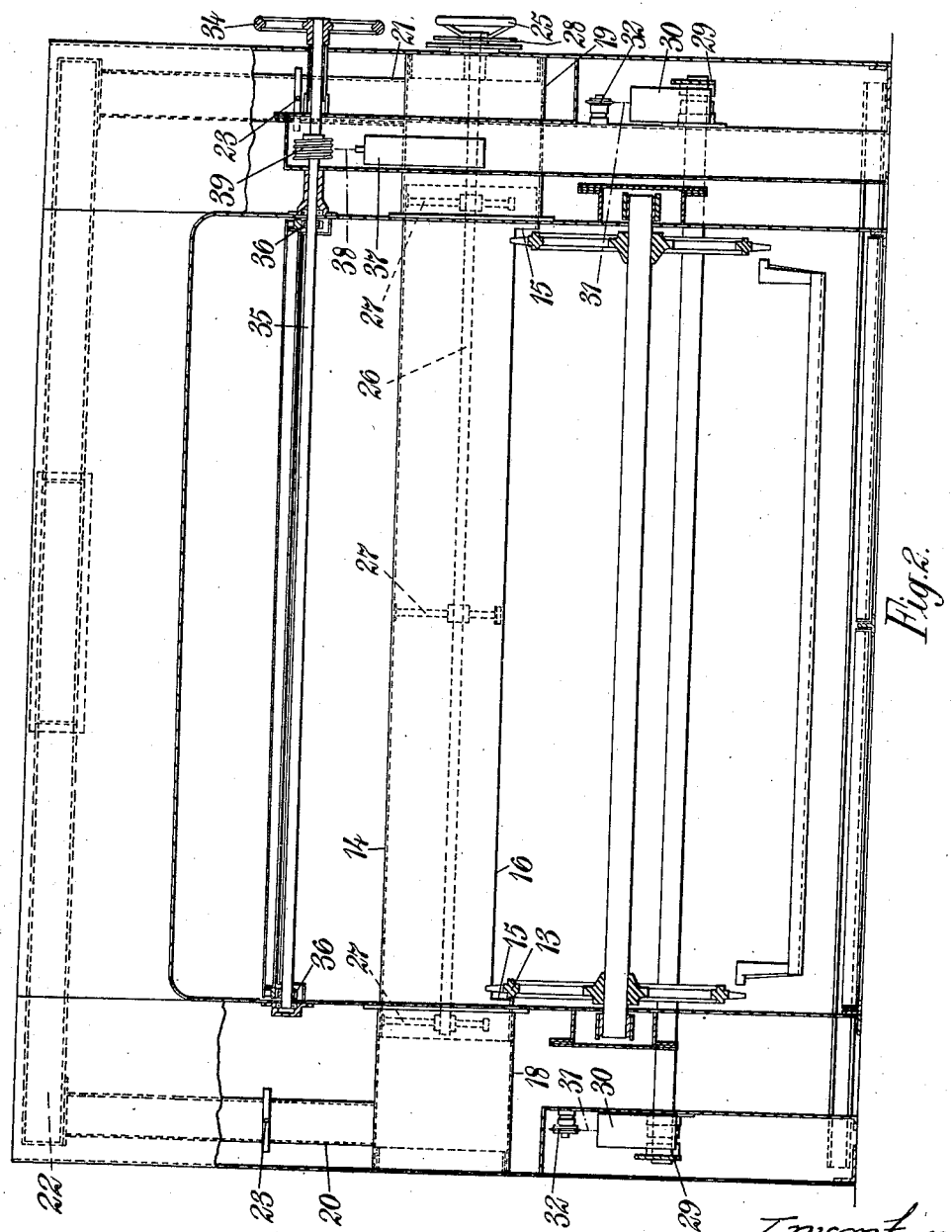

2,205,576

UNITED STATES PATENT OFFICE 2,205,576

BAKER'S AND LIKE OVEN

John Edward Pointon and Claude Dumbleton, Peterborough, England, assignors to Baker Perkins Incorporated, Saginaw, Mich.

Application December 28, 1939, Serial No. 311,396
In Great Britain December 16, 1938

6 Claims. (Cl. 107—57)

This invention relates to bakers' and like ovens wherein the baking or heat treatment takes place in a static or a circulating atmosphere whichever may be desired according to the baking and conditioning of the product.

The invention is especially suitable for application to bakers' ovens of the baking swing tray conveyor type, such as described for example in United States Patent No. 1,942,974 issued Jan. 9, 1934, to John E. Pointon and Warwick H. Beanes, and for convenience hereinafter the invention will be described with reference to a conveyor oven having an ante-chamber or zone and conveyor turning point adjacent the charging door.

An aim of the invention is to control or adjust the level of the steam and air baking atmosphere in the oven and a further aim of the invention is to isolate a portion of the baking or ante-chamber from the circulating atmosphere.

Another aim of the invention is to control or adjust the circulation of the steam and air baking atmosphere in the oven so that a static condition may be maintained, or a flow of air and steam in either direction, i. e. with the travel of the conveyor or counter thereto, whichever may be desired.

In conveyor ovens where the conveyor travels round turning point chain wheels in an ante-chamber to the oven proper and adjacent to the charging door, hot air and steam in certain circumstances may escape through the door to the detriment of the bread and inconvenience and possible harm to the operator.

An object of the present invention is to prevent the egress of steam atmosphere through the charging door or opening and in effect to isolate the associated portion of the ante-chamber or zone from the atmosphere of the oven.

Another object of the invention is to provide means for controlling the direction of circulation or flow of the baking atmosphere irrespective of the direction of travel of the oven conveyor, or to maintain as far as possible a static condition.

A feature of the invention lies in the provision of conduit means in the form of an inverted channel, the flanges or sides of which are adjustable to alter the level at which the steam atmosphere can enter the channel. This adjustment may be effected by mounting the flanges on pivots or making them slidable or by displacement of the conduit as a whole, as for example by tilting or rotating it about its longitudinal axis.

The invention further consists in controling the direction of flow of the heating atmosphere by employing baffles or partition means in conjunction with an evacuating conduit or device so that by adjustment the suction may take effect at one side of the baffle means or the other.

In the accompanying drawings:

Figure 1 is a longitudinal section of a baker's oven embodying the invention;

Figure 2 is a cross-section.

In carrying the invention into effect according to one convenient mode as applied to a conveyor oven having an ante-chamber or zone 5 in which a charging door 6 is provided opposite the lowermost turning point of the conveyor, a baffle or partition 7 is provided transversely of the oven and extending between the upper and lower laps 8 and 9 of the conveyor chain which are guided by the tracks 10 and 11. The baffle has a forward extension or plate 12 which terminates in the vicinity of the turning point of the conveyor around the sprocket wheels 13.

Adjoining the lower extremity of the partition plate 12 and occupying a considerable portion of the space between the laps of the conveyor in this region an inverted channel element or conduit 14 is provided. This channel element is adapted to serve as a conduit or duct and extends substantially from side to side of the oven.

The channel or conduit 14 is of circular shape and is provided with a downwardly directed opening 15 having longitudinal edges 16 and 17.

The conduit 14 is open at its ends and extends into sleeves 18 and 19 located at the sides of the oven. These sleeves open into vertical flues 20 and 21 which communicate with a transverse flue 22 at the top of the oven. A fan or other evacuating means is coupled to the transverse flue 22.

Sliding dampers 23 operated by bars 24 are located in the vertical flues 20 and 21. Rotary or oscillatory dampers may replace the sliding dampers.

The conduuit 14 is adapted to be rotated about its axis in the sleeves 18 and 19 and for this purpose an operating hand wheel 25 is provided. This hand wheel is secured to a spindle 26 pinned to spiders 27 mounted within and secured to the conduit. An indicator 28 is provided for indicating the positon of the adjusted positions of the opening 15 in the conduit.

The door 6 is carried by pivoted arms 29 and is counterweighted by weights 30 attached to steel ropes or chains 31 passing over guide pulleys 32.

Above the door 6 a sliding door or shutter 33 is mounted and is adjustable by a hand wheel 34 operating a shaft 35 having pinions 36 meshing with racks on the shutter. A counterweight 37 is provided for the chain or cable 38 which passes around the pulley or drum 39 secured to the shaft 35.

The channel or conduit 14 may be closed at one end, the other alone being in communication with the suction fan, flue or other evacuating means.

The edges 16 and 17 of the channel or conduit 14 may be adjusted as to height by rotating the conduit, and it will be appreciated that by such adjustment the level at which steam atmosphere can enter the conduit from the one side or the other may be varied. Thus if the conduit is rotated clockwise as seen in Figure 1 so that the edge 17 is lower than the edge 16 then steam atmosphere can be induced to flow in from the left of the conduit. Similarly if the conduit is rotated counterclockwise so that the edge 17 is at a higher level than the edge 16 then steam atmosphere will flow into the conduit from the right. In this way the steam atmosphere can be induced to travel into the suction conduit from one side or the other and a flow promoted on the corresponding side of the adjoining partition or baffle 7 and 12. Consequently the direction of circulation within the oven can be governed and the direction of travel or flow of the atmosphere reversed independently of whether the baked bread tins travel downwardly past the charging door 6 and the newly charged tins enter the steam atmosphere upwardly after having passed around the turning point chain wheels 13 or vice versa.

The rate of circulation of the atmosphere can be varied by the operation of the dampers 23 in the flue 20 and 21 or by a control of the fan or other suction device.

When the conduit is adjusted so that the edges 16 and 17 are level, steam atmosphere will flow into the conduit below both edges and circulation within the oven will stop, so that a static condition of the atmosphere will obtain.

The conduit need not be circular in cross section but may be of any other convenient shape providing a downwardly opening conduit or inverted suction channel.

According to an alternative mode of adjustment the inverted suction channel may be provided at its ends with trunnions, one of which may pass through the oven wall and be provided with a worm wheel and worm for adjusting the angularity of the conduit. Upon operating the worm the suction conduit is canted or tilted about its axis so that while one lip or edge of the channel or opening is raised the other is lowered in order to determine the height at which the steam atmosphere shall enter and/or to determine the direction in which the circulation should take place.

Where a tilting conduit other than one of circular cross-section is employed an arcuate surface struck from the rocking axis of the suction member is provided and the partition or baffle means has its lower edge located adjacent or touching the arcuate surface so as to avoid any short circuit or by-passing of the gases.

Instead of the pivoting or tilting channel with fixed edges, such as 16 and 17, an inverted channel or U conduit may be rigidly mounted in position and be provided with adjustable flaps associated with the edges or lips of the opening. These hinged flaps may be moved inwardly from a vertical or depending position to a substantially horizontal position whereby the level at which the steam atmosphere of the oven may enter the conduit from one side or the other may be varied.

With this form by an equal adjustment of both flaps the level of escape for the steam while maintaining a static atmosphere may be varied.

The independent adjustable flap form may be applied to a circular conduit which may also be pivotally mounted. In such case the flap may be curved to the curvature of the conduit and the adjustment may be effected by longitudinal movement of the flaps the connection between the flaps and the conduit comprising inclined slots and cooperating pins.

The invention may be applied to a conveyor oven in which there are a series of laps back and forth within the oven, in which case a series of partition or baffle members is provided in order to control and direct the flow of the atmosphere along the conveyor laps.

It will be appreciated that one of the prime effects of the suction box is to evacuate the atmosphere from the lower part of the ante-chamber and prevent any escape of steam through the charging door or across the dough or bread in the tins adjacent the door.

By means of the invention the amount of atmospheric movement around the product as it enters the baking chamber may be controlled. Thus control may be effected if it is found that there is excessive circulation through exit of steam and entry of cold air to the baking chamber.

We claim:

1. Apparatus for exhausting and controlling the flow of atmosphere in an oven having a travelling tray conveyor which passes through an ante-chamber or zone adjacent the charging door, comprising an inverted channel opening downwardly disposed transversely in the ante-chamber adjacent the charging door and connected with a source of suction, the lateral edges of the channel being adjustable up and down to alter the direction of flow and the level at which the oven atmosphere can enter the channel.

2. Apparatus as claimed in claim 1, wherein the channel is mounted to tilt about a longitudinal axis to raise or lower its lateral edges.

3. Apparatus as claimed in claim 1, wherein partition means between runs of the conveyor is arranged in conjunction with the evacuating channel, whereby the suction may take effect from one side of the partition or the other.

4. Apparatus as claimed in claim 1, wherein the channel means is circular in cross-section and is mounted at its ends in trunnions or sleeves, the channel having a downwardly directed opening extending longitudinally thereof, the edges of which are adjustable vertically by rotating the channel.

5. Apparatus as claimed in claim 1, wherein the channel communicates with flue means coupled to a source of suction, the flue means being provided with flow controlling means such as a damper.

6. Means for evacuating the steam atmosphere or for controlling the direction of flow of the atmosphere in an oven, comprising conduit means having a downwardly directed opening located transversely of the oven in the vicinity of the charging door, flue means coupling the conduit means to an exhausting fan, and means for vertically adjusting the edges of the opening in the conduit by tilting the conduit.

JOHN EDWARD POINTON.
CLAUDE DUMBLETON.